Sept. 19, 1950  C. T. BOST  2,522,813
LUMBER STACKING APPARATUS
Filed July 31, 1946  3 Sheets-Sheet 1

Inventor:
Cecil T. Bost
By Paul A. Eaton
Attorney

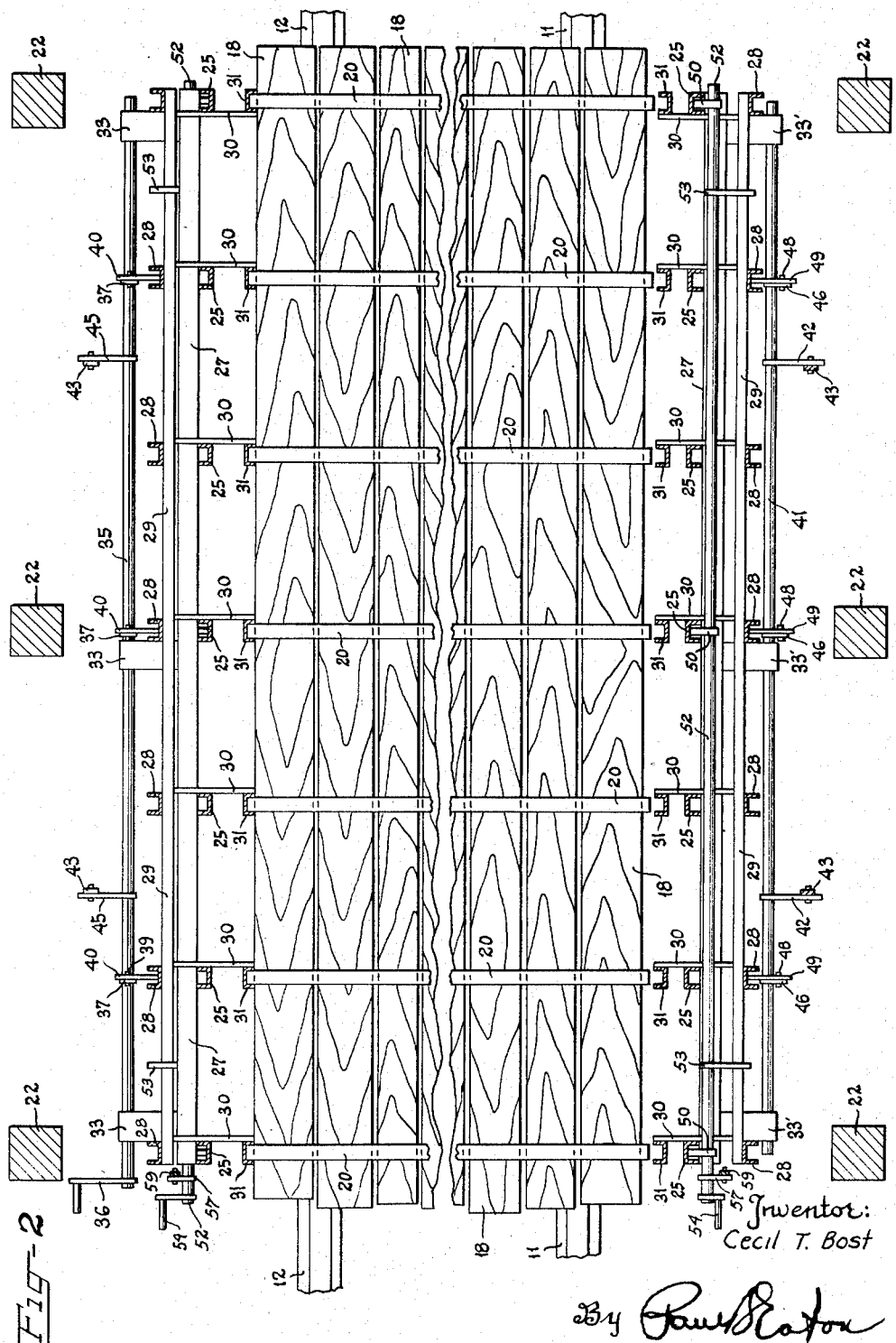

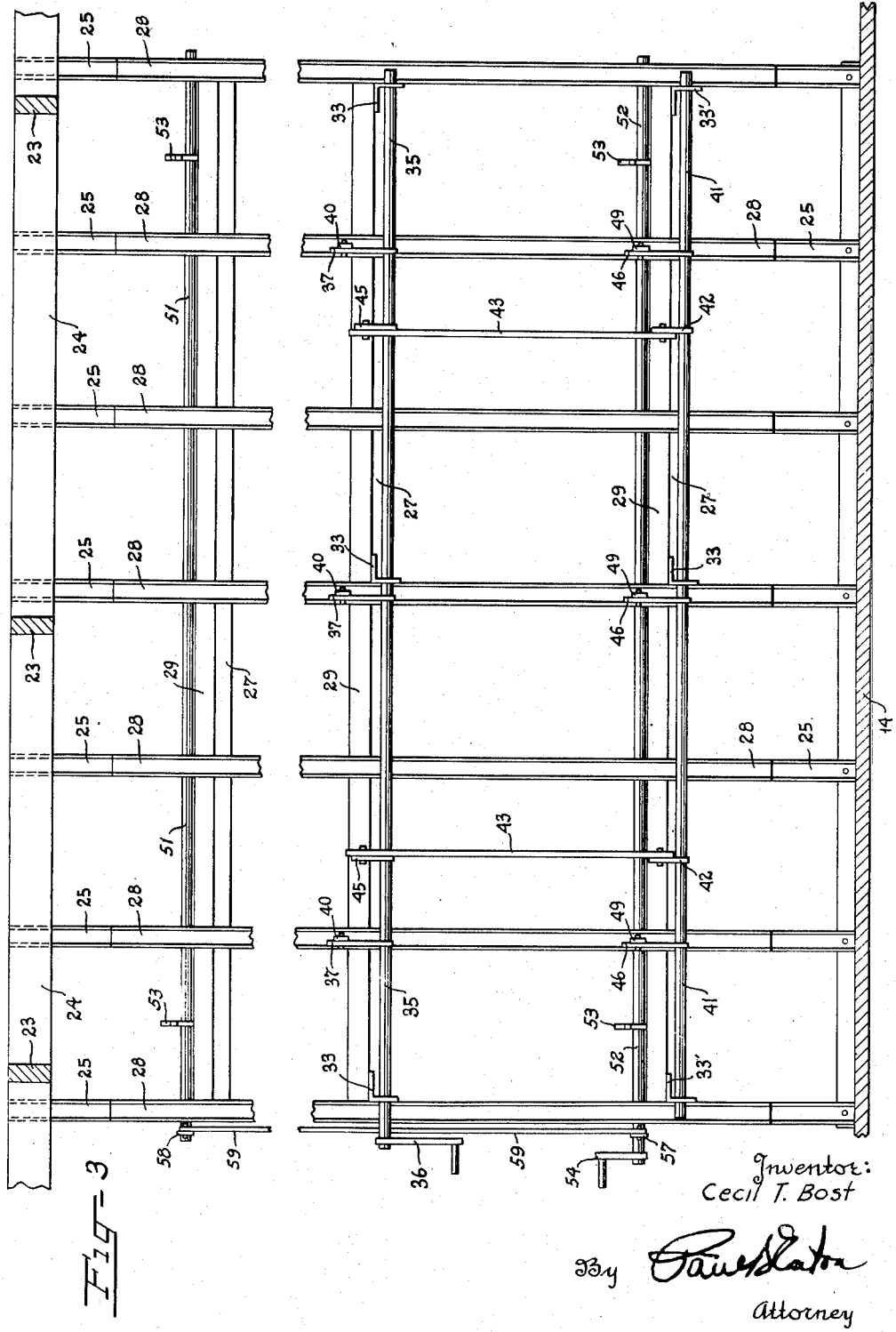

Patented Sept. 19, 1950

2,522,813

UNITED STATES PATENT OFFICE 2,522,813

LUMBER STACKING APPARATUS

Cecil T. Bost, Hickory, N. C., assignor to Hickory Manufacturing Company, Hickory, N. C., a corporation of North Carolina Application July 31, 1946, Serial No. 687,378

1 Claim. (Cl. 214—10.5)

This invention relates to stick guides for use in the spacing of lumber which is being stacked on a flat car to be run into a kiln for drying purposes. As is well known, it is desirable that the sticks facing the layers of lumber undergoing drying in a kiln should be placed in exact vertical alinement so that each board will be properly spaced and no particular layer will be subjected to uneven strain leading to warping or twisting of the lumber.

One of the objects of the present invention is to produce vertically disposed stick guides on each side of a trackway on which a car is mounted to be loaded with lumber prior to being rolled into a kiln for drying, which stick guides are movable to proper position to guide the sticks as they are dropped downwardly onto the layers of lumber being stacked on the car and which will accurately and reliably space the sticks in vertical alinement on the truck or car, said guides being movable laterally away from the ends of the sticks when the car has been fully loaded with lumber so that they will not form any obstruction whatever to rolling of the car of lumber into the kiln.

Some of the objects of the invention having been stated, other objects will appear as the description proceeds, when taken in connection with the accompanying drawings, in which:

Figure 2 is a sectional plan view taken along the line 2—2 in Figure 1;

Figure 3 is a vertical sectional view taken along the line 3—3 in Figure 1.

Figure 1:
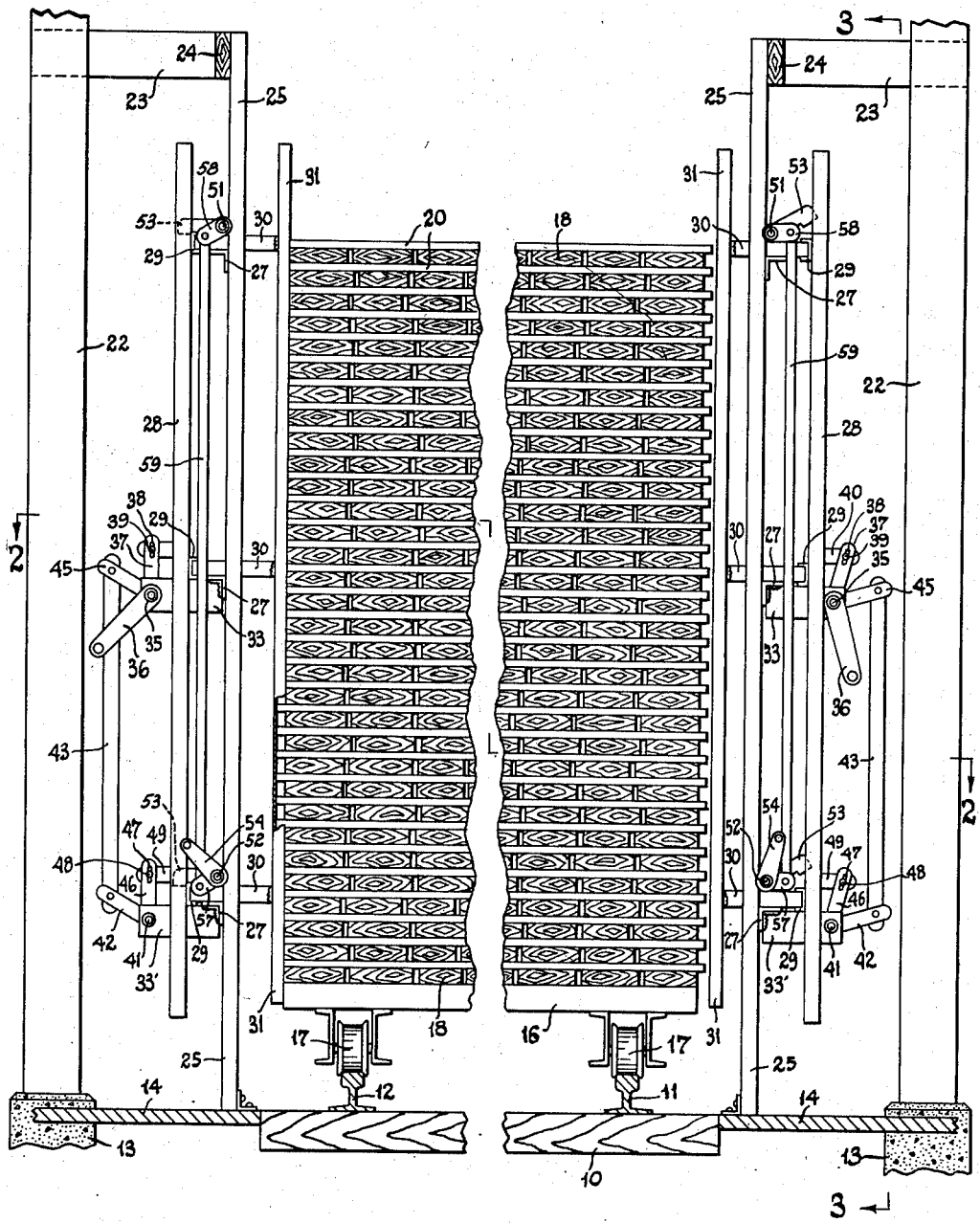
Figure 1 is an end elevation of the apparatus and showing a car in which lumber has been stacked with the aid of the structure therein shown.

Referring more specifically to the drawings, the numeral 10 indicates suitable crossties on which a pair of rails 11 and 12 are mounted, said crossties 10 being supported in any suitable manner, such as by lying on the ground, but the means of support are not shown. Rising from the ground also are a plurality of concrete pedestals 13 and fitting around these pedestals and extending to the ends of the crossties is a suitable floor 14 made of any suitable material and supported in any desired manner.

Mounted for travel on the tracks 11 and 12 is a flat truck 16 having wheels 17 and onto which pieces of lumber 18 are adapted to be stacked. It is common practice to place a plurality of spaced strips or laths 20 between each layer of lumber 18 and these strips 20 should be in vertical alinement with each other so as to prevent warping or sagging of the lumber during a drying operation.

In order to insure that these spacing sticks 20 are quickly placed and in vertical alinement and equal distances from each other, there has been provided an apparatus associated with each side of the trackway for guiding these sticks to the proper position quickly and efficiently. The apparatus on both sides of the trackway is identical and like reference characters will apply. Disposed on each side of the trackway and mounted on the upper end of pedestals 13 is a plurality of posts 22 having laterally projecting arms 23 at their upper ends to which is secured a horizontally disposed scantling 24.

Mounted on the proximate faces of scantling 24 and suitably secured thereto at their upper ends is a plurality of channel members 25. The lower ends of these channel members are suitably secured to the floor 14. Mounted in horizontal position on these vertical channels 25 is a plurality of angle irons 27. Disposed in vertical position between the channel members 25 and the posts 22 is a plurality of channel members 28 which have welded thereto on the side next to the trackway a plurality of horizontally disposed channel bars 29. These channel bars 29 each have welded thereto a horizontal bar 30 and to the inner ends of these bars 30 is welded or otherwise secured a plurality of vertically disposed channel guide bars 31.

Bars 30 which have their ends joined to the vertical channels 31 and the horizontal channels 29 are slidably supported on the horizontal angle bars 27. In the drawings, three of the channel bars 27 are shown and to the middle one is welded a plurality of outwardly projecting angles 33, which project outwardly beyond the outer confines of the vertical channels 28. The horizontal channels 29 also slidably engage the upper surfaces of the angles 33. In the outer end of the angles 33 is rotatably mounted a shaft 35 having a crank arm 36 on one end thereof for manipulating the same. This shaft 35 has a plurality of uprising arms 37 extending therefrom which are slotted, as at 38, and receive a pin 39 in the outer ends of the blocks 40 welded to the vertical channels 28. Also welded to the lower horizontal angle 27 is a plurality of angle members 33' which are identical to the angle members 33. In the outer ends of these angles 33' is rotatably mounted a shaft 41 having an arm 42 thereon which has a link 43 pivotally secured to its outer end which projects upwardly and is also pivotally secured to a link 45 extending from shaft 35.

The shaft 41 also has a plurality of arms 46 extending upwardly therefrom and slotted as at 47 which receives a pin 48 on the lugs 49 welded to the vertical channels 28. By this arrangement, it is possible to rotate the crank 36 from the position shown in the right hand side of Figure 1 to the position shown at the left hand side of Figure 1, which will move the vertical channel guides 31 inwardly to the position shown so that when both sides of the apparatus have been moved inwardly the channels 31 will be the right distance apart to allow the spacing sticks 20 to fall down into these channels but which sticks cannot move laterally with respect to the channels as they are guided by the channels.

The vertical channels 25 have extending therefrom near their upper and lower ends suitable lugs 50 in which is rotatably mounted upper and lower shafts 51 and 52, said shafts having a plurality of dogs 53 secured thereto and extending outwardly therefrom.

The lower shaft 52 has an arm 57 extending therefrom and between arms 57 and 58 projecting from shaft 51 is pivotally secured a link 59 which joins these two arms 58 and 57 together. The lower shaft 51 has a crank 54 secured on one end thereof. By rotating the crank 54 it is possible to move the dogs 53 downwardly behind the channels 29 to occupy the position shown in the left hand portion of Figure 1 to lock the movable assembly comprising the vertical guide channels 31 in position for receiving the guide sticks 20.

It is thus seen that there has been provided in this apparatus means whereby guiding channels can be instantly placed in position for guiding the stacking strips which occur between the layers of lumber and which by merely turning a pair of handles can be removed entirely from the ends of the stacking strips and thus free the car for rolling into the kiln.

In the drawings and specification, there has been set forth a preferred embodiment of the invention, and although specific terms are employed, they are used in a generic and descriptive sense only and not for purposes of limitation, the scope of the invention being defined in the claim.

I claim:

Means for guiding sticks in packing lumber on a flat car comprising a plurality of vertically disposed channel guides disposed on each side of the car for guiding the ends of the sticks onto the top of the lumber being stacked, a framework for supporting said channel guides comprising a plurality of upright members and a plurality of horizontally disposed members, means secured to the channel guides and slidable inwardly and outwardly towards the lumber on said horizontal disposed members, means connecting the slidable means on the horizontally disposed member together for unitary movement, a plurality of supports mounted on the framework having an oscillatable rod mounted therein provided with a crank for turning the same and a lever extending from said rod and connected to the slidable members disposed on the horizontally disposed members for moving the vertical channel guides inwardly and outwardly relative to the car, means for locking the channel guides in stick guiding position, said shaft being oscillatable to move the channel guides into stick guiding position or to move the channel guides into nonguiding position.

CECIL T. BOST.

REFERENCES CITED

The following references are of record in the file of this patent:

UNITED STATES PATENTS

| Number | Name | Date |
|---|---|---|
| 1,563,030 | Huffman | Nov. 24, 1925 |

FOREIGN PATENTS

| Number | Country | Date |
|---|---|---|
| 362,415 | Great Britain | May 29, 1930 |